(12) United States Patent
François

(10) Patent No.: US 7,677,159 B2
(45) Date of Patent: Mar. 16, 2010

(54) APPARATUS FOR PREPARING HOT BEVERAGES, IN PARTICULAR SOUPS

(76) Inventor: Jean-Jacques François, 17, route du Temple, 22370 Pleneuf Val André (FR)

( * ) Notice: Subject to any disclaimer, the term of this patent is extended or adjusted under 35 U.S.C. 154(b) by 1384 days.

(21) Appl. No.: 10/503,654

(22) PCT Filed: Feb. 3, 2003

(86) PCT No.: PCT/FR03/00329

§ 371 (c)(1), (2), (4) Date: Mar. 1, 2005

(87) PCT Pub. No.: WO03/065860

PCT Pub. Date: Aug. 14, 2003

(65) Prior Publication Data

US 2005/0139079 A1    Jun. 30, 2005

(30) Foreign Application Priority Data

Feb. 5, 2002    (FR) .................................. 02 01312

(51) Int. Cl.
*A47J 31/00* (2006.01)

(52) U.S. Cl. ...................................... 99/323.3; 99/275

(58) Field of Classification Search ........... 99/279–307, 99/275, 323, 516, 452–455, 536
See application file for complete search history.

(56) References Cited

U.S. PATENT DOCUMENTS

| | | | | |
|---|---|---|---|---|
| 3,641,918 A | | 2/1972 | Schellgell et al. | |
| 5,836,169 A | * | 11/1998 | Marlette | 62/331 |
| 5,862,738 A | * | 1/1999 | Warne | 99/281 |
| 6,073,539 A | | 6/2000 | Gremillion et al. | |
| 6,726,947 B1 | * | 4/2004 | Gutwein et al. | 426/433 |
| 6,759,072 B1 | * | 7/2004 | Gutwein et al. | 426/433 |
| 6,805,041 B2 | * | 10/2004 | Colston et al. | 99/295 |
| 6,808,731 B1 | * | 10/2004 | Gutwein et al. | 426/433 |
| 6,915,732 B2 | * | 7/2005 | Jones et al. | 99/275 |
| 7,028,603 B1 | * | 4/2006 | Gremillion et al. | 99/290 |
| 7,182,970 B2 | * | 2/2007 | Tobin | 426/597 |

FOREIGN PATENT DOCUMENTS

| | | |
|---|---|---|
| WO | WO 0016674 | 3/2000 |
| WO | WO 0176429 | 10/2001 |

* cited by examiner

Primary Examiner—Timothy F. Simone
(74) Attorney, Agent, or Firm—Gary M. Cohen

(57) ABSTRACT

An apparatus for preparing hot beverages, in particular soups, includes a frame (1) containing a heating system (2) for heating water drawn from a water main or, alternatively, from a tank, and for converting the water into pressurized steam. The steam is delivered to a heating chamber (3) having a discharge duct (4) that passes through the heating chamber. A beverage to be prepared is stored in an aseptic pack (61) placed in a removable receptacle (7) housed in the frame (1). The liquid beverage is delivered from the aseptic pack (61) to the discharge duct (4) by a sequential dispenser (6), and is then discharged to a container (5).

20 Claims, 2 Drawing Sheets

APPARATUS FOR PREPARING HOT BEVERAGES, IN PARTICULAR SOUPS

BACKGROUND OF THE INVENTION

The present invention relates to an electrical apparatus for preparing a hot beverage, and more particularly, to an electrical apparatus for preparing hot liquid beverages that are prepackaged in an aseptic bag.

Electrical apparatuses are known for preparing hot beverages, in particular, coffee. In such an apparatus, water is converted to steam and the steam and its condensate are brought into contact with ingredients, which are often freeze-dried. This allows a beverage to be made which has been metered and packaged beforehand.

Such an electrical apparatus, however, does not enable the preparation of hot beverages from a liquid ingredient that is almost ready for use, and that only needs to be heated up. The present invention, therefore, relates to a novel apparatus for preparing such beverages, in particular, soups.

SUMMARY OF THE INVENTION

To this end, and in accordance with the present invention, an apparatus is provided for preparing hot beverages, in particular, soups. The apparatus has a frame which contains a heating system. Water drawn from a water main or, alternatively, from a tank is heated by the heating system, and is converted into pressurized steam. The steam is then directed to a chamber having a discharge duct that passes through the chamber. The liquid beverage to be prepared passes through the discharge duct. The beverage is stored in an aseptic bag placed in a removable receptacle housed in the frame, and is sequentially dispensed and conveyed to the discharge duct, for eventual delivery to a container for receiving the beverage.

The receptacle for the beverage to be prepared advantageously includes four side walls forming a parallelepiped, and an end wall having an opening for passing the connection between the aseptic bag and the sequential dispenser. At least one of the four side walls, and the end wall, are removable.

The sequential dispenser for the beverage is advantageously implemented as a peristaltic pump having a frame to which is fastened a motor. The motor includes a shaft which rotationally drives a roller-holder having bearing rollers in contact with deformable tubing. One of the ends of the deformable tubing is connected to the aseptic bag containing the beverage and the other end of the deformable tubing is connected to the duct for discharging the beverage.

The deformable tubing preferably includes a connector for mating with a connector on the aseptic bag. The connections are preferably implemented using threaded, circular flange-type connectors capable of piercing the aseptic bag.

The heating chamber and the discharge duct are arranged on the same removable support, which will hereafter be referred to as a "dispensing spout". In a preferred embodiment of the present invention, the removable dispensing spout has a first pipe which, when in use, is placed substantially vertically in the apparatus. A second pipe connected perpendicular to the first pipe (preferably, by welding) provides a connection to a pressurized steam outlet duct. A third pipe is coaxially mounted (preferably, by rings) inside the first pipe, forming the discharge duct. The steam outlet is advantageously provided with a quick-coupling connection having a closable orifice for joining with the second pipe of the dispensing spout and for avoiding any risk of steam escaping when the dispensing spout is disconnected.

The apparatus preferably includes a computer-type processor for controlling the sequential dispenser and the heating system, which can be actuated by at least one switch.

These and other features of the present invention will become apparent from the following description of an exemplary embodiment of the present invention, with reference to the attached drawings.

DETAILED DESCRIPTION OF PREFERRED EMBODIMENTS

Figure 1:
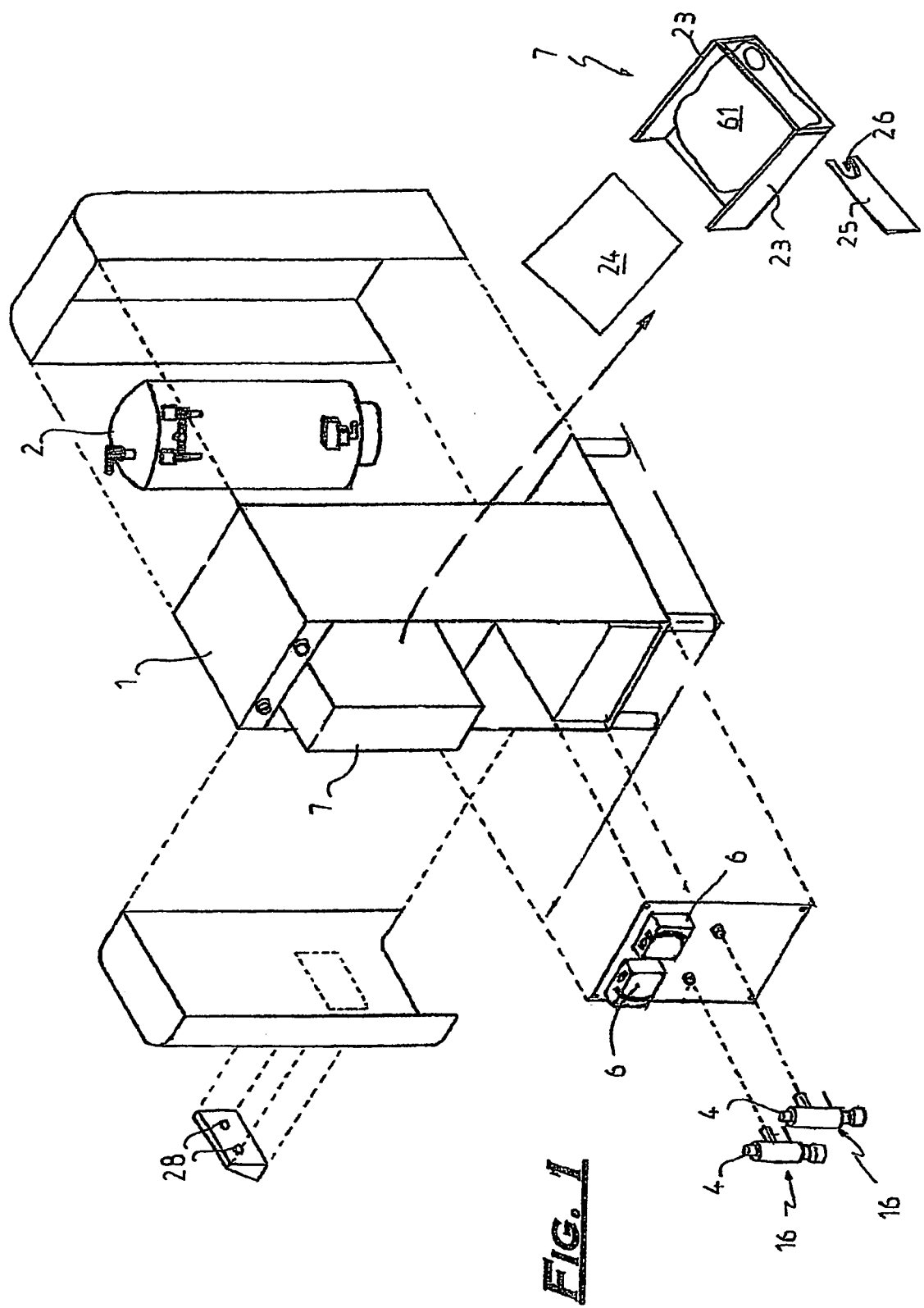
FIG. 1 is an exploded isometric view of the apparatus of the present invention.

FIG. 1 shows an apparatus for preparing hot beverages in accordance with the present invention, for example, for making soups. The apparatus includes a frame 1 containing a system 2 for heating water, and for converting the water into pressurized steam. The water can be drawn from a water main or, alternatively, from a tank.

Figure 2:
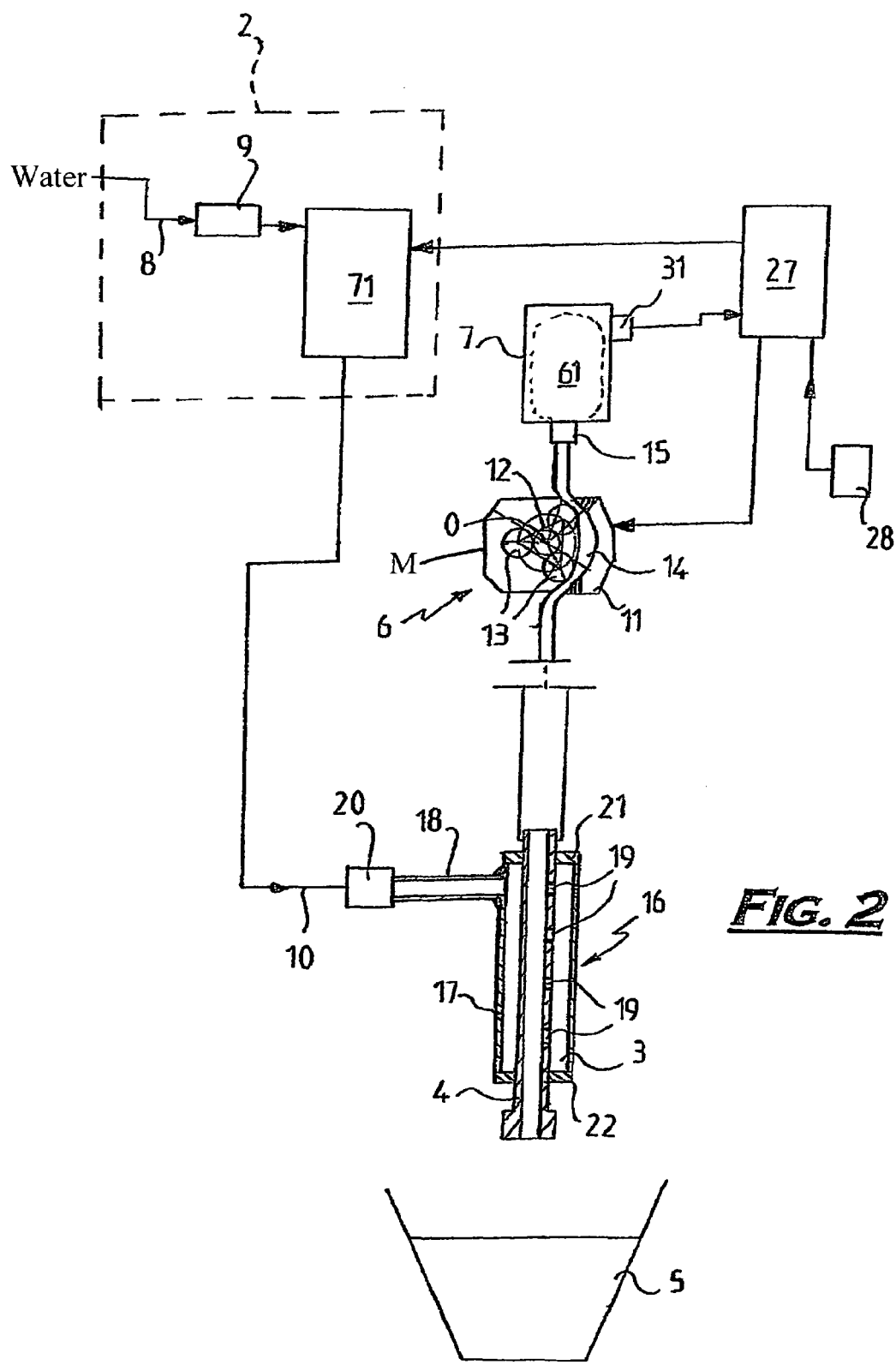
FIG. 2 is a schematic diagram showing operation of the apparatus of the present invention.

Referring to FIG. 2, the steam is then directed to a heating chamber 3. A discharge duct 4 for receiving a liquid beverage to be prepared passes through the heating chamber 3. The liquid beverage to be prepared is stored in aseptic packs (shown at 61 in FIG. 1), and is conveyed to the discharge duct 4 by a regulator 6 for sequentially dispensing the beverage stored in an aseptic pack 61, which is placed in a removable receptacle 7 housed in the frame 1. The heated beverage is discharged from the duct 4, into a container 5. It will be noted that the apparatus shown in FIG. 1 can be equipped with two of the aseptic packs 61, making it possible to dispense two beverages simultaneously.

The heating system 2 for producing the pressurized steam can, for example, be a conventional water heater connected by a duct 8 to a water intake coming either from the water main or from the tank. A booster pump 9 is provided for introducing the drawn water into a water heater 71. A duct 10 provided at the outlet from the water heater 71 conveys the pressurized steam to the heating chamber 3, for heating the beverage.

The regulator 6 for sequentially dispensing the beverage is advantageously implemented as a peristaltic pump. As is conventional, the peristaltic pump includes a frame 11 to which is fastened a motor M having a shaft 0 that rotationally drives a roller-holder 12. The roller-holder 12 supports at least three rollers 13, which are arranged at angles of 120 degrees with respect to the rotation shaft 0. The rollers 13 are in contact with deformable tubing 14 that passes through the regulator 6. One end of the deformable tubing 14 is connected to the aseptic pack 61 containing the beverage. The other end of the deformable tubing 14 is connected to the duct 4 for discharging the beverage. The space defined between two adjacent rollers 13 corresponds to a predetermined serving of the beverage being dispensed when the pump is rotated by the motor M.

It will be noted that to avoid any contact between the beverage and the operator's hands, the deformable tubing 14 is provided with a fitting 15 for connection to the aseptic pack 61. The fitting 15 is of the threaded, circular flange type, and is capable of piercing the bag 61.

When the deformable tubing 14 is compressed between the rollers 13 and the frame 11 of the pump 6, establishing a compressed zone, a vacuum is produced in the deformable tubing 14 that is immediately filled with a predetermined portion of the beverage. The amount of liquid beverage trapped in the deformable tubing 14, between the two rollers 13, is then delivered to the discharge duct 4, and then, under gravity, to the container 5.

To ensure that the apparatus can be serviced easily, the heating chamber 3 and the discharge duct 4 are arranged on a single, removable support, which will be referred to as a "dispensing spout" in the remainder of the present description, and which is designated by the general reference 16. The removable dispensing spout 16 includes a first pipe 17 which, when in use, is placed substantially vertically in the apparatus. A second pipe 18 is connected perpendicular to the first pipe 17, preferably by welding, forming a connection to the pressurized steam outlet duct 10. A third pipe is mounted coaxially within the first pipe 17, using a pair of rings 21 and 22, forming the discharge duct 4.

The heating chamber 3 is formed between the third pipe forming the discharge duct 4 and the first pipe 17. To ensure sufficient heat exchange between the steam in the heating chamber 3 and the beverage in the discharge duct 4 to heat the beverage to a temperature on the order of 75° C., the third pipe forming the discharge duct 4 is, over its length, provided with at least three, and preferably four orifices 19 for passing some of the pressurized steam toward the beverage. The orifices 19 also make it possible to remove any particles that may have stuck to the inside of the discharge duct 4 during dispensing of the beverage, especially of a soup, after the end of a dispensing cycle that will be described in detail below.

To ensure the safety of an operator when servicing the apparatus, the steam outlet duct 10 is provided with a quick-coupling connector 20 for joining the outlet duct 10 with the second pipe 18 of the dispensing spout 16. The quick-coupling connector 20 is provided with a closable orifice to avoid any risk of steam escaping when the dispensing spout 16 is disconnected.

FIG. 1 shows details of an embodiment of a receptacle 7 for the beverage to be prepared, which is contained in an aseptic pack 61. The receptacle 7 advantageously includes four side walls 23, 24, which form a parallelepiped, and an end wall 25. At least one of the side walls 24 is removable. The end wall 25 can also be removed, and has an opening 26 for passing the fitting 15 for connecting the pack 61 and the sequential dispenser 6. The removable walls 24 and 25 of the receptacle 7 advantageously make it possible to properly position the pack 61, without the risk of it tearing.

As is diagrammatically shown in FIG. 2, the apparatus is also provided with a computer-type processor 27 for controlling the sequential dispenser 6 and the heating system 2. The processor 27 can be actuated, for example, by switches 28 or some other equivalent control.

Operation of the apparatus of the present invention will be clear from the above description, and will now be further explained with reference to FIGS. 1 and 2.

Upon actuation of the switch 28, which can, for example, be provided on the outer surface of the apparatus, the processor 27 causes the heating system 2 to produce steam, which is then delivered to the chamber 3 of the dispensing spout 16. Cumulatively with the production of the steam, the regulator 6 (i.e., the peristaltic pump) is caused to operate, to sequentially deliver a predetermined amount of the beverage to be prepared to the discharge duct 4. This continues until the total volume of the desired quantity of beverage, for example, 250 ml, has been delivered to the discharge duct 4. To be noted is that the successive passage of a controlled amount of beverage through the dispensing spout 16 allows sufficient heat exchange between the beverage and the steam to bring the beverage to be prepared up to temperature.

As soon as the desired quantity of beverage has been dispensed, steam is further discharged into the heating chamber 3 for a predetermined time, on the order of 1 second, that advantageously makes it possible to remove particles stuck to the discharge duct 4. A new dispensing command can then be implemented by the apparatus by once again pressing on the switch 28.

Suitable commands for rinsing of the apparatus can also be implemented, using equipment arranged inside the apparatus so as to completely clean it, particularly when changing the aseptic pack 61. Such rinsing commands can be implemented, for example, using a breaker that only causes operation of the heating system 2, for producing steam for delivery to the dispensing spout 16, for a period of time of about 3 to 5 seconds.

The processor 27 can also manage replacement of the aseptic pack 61. This can include replacement of the aseptic pack 61 when it reaches its "best-before date", for example, after 24 hours for a soup. This can also include replacement of the aseptic pack 61 responsive to whether or not there is a sufficient amount of the desired beverage left in the pack. To this end, a switch 31 linked to the processor 27 is actuated when the receptacle 7 containing the beverage is put in place, starting the countdown of a clock.

As a further alternative, the apparatus can be provided with at least two switches 28, for determining two different volumes of beverage to be prepared. It will be noted that the motor of the peristaltic pump will rotate to a greater or lesser extent, depending on which of the two switches is pressed.

It will be clear from the above description that the electrical apparatus for preparing ready-to-use hot beverages is relatively simple to produce and makes it possible to heat a beverage to a desired temperature within a relatively short period of time. In about 12 to 14 seconds, around 250 ml of beverage can be heated to a temperature of 75° C. Furthermore, such an apparatus meets hygiene standards because no contact is possible between the beverage and someone's hands, because the apparatus cleans the dispensing spout after every beverage dispensed, and because the spout is completely removable.

Although the present invention has been described in connection with a specific embodiment, it is to be understood that the invention further encompasses all technical equivalents of the means described.

The invention claimed is:

1. An apparatus for preparing hot beverages, including soups, comprising a frame containing a water heater that draws water from a water main or a tank and that converts the drawn water into pressurized steam, for delivering the steam to a heating chamber associated with the frame and having a discharge duct passing through the heating chamber, wherein the beverage to be prepared passes through the discharge duct and to a container while the steam is delivered to the heating chamber, wherein the beverage is delivered from an aseptic pack containing the beverage to the discharge duct by a sequential dispenser, and wherein the aseptic pack containing the beverage is placed in a removable receptacle housed in the frame.

2. The apparatus of claim 1 wherein the beverage is in liquid form.

3. The apparatus of claim 2 wherein the liquid beverage further includes particles contained in the liquid.

4. The apparatus of claim 1 wherein the receptacle includes four side walls forming a parallelepiped, coupled with an end wall.

5. The apparatus of claim 4 wherein at least one of the side walls is removable.

6. The apparatus of claim 5 wherein the end wall is removable.

7. The apparatus of claim 6 wherein the end wall includes an opening for passing a fitting for connecting the aseptic pack and the sequential dispenser.

8. The apparatus of claim 1 wherein the sequential dispenser is a peristaltic pump including a frame, a motor fastened to the frame of the sequential dispenser having a shaft that rotationally drives a roller-holder supporting a plurality of bearing rollers, and deformable tubing for receiving the beverage positioned between the frame of the sequential dispenser and the bearing rollers, wherein the bearing rollers are in contact with the deformable tubing, wherein one end of the deformable tubing is connected to the aseptic pack, and wherein an opposite end of the deformable tubing is connected to the discharge duct.

9. The apparatus of claim 8 wherein the deformable tubing includes a fitting for connection to a mating fitting on the aseptic pack.

10. The apparatus of claim 9 wherein the fitting coupled with the deformable tubing and the fitting coupled with the aseptic pack are threaded, circular flange-type connectors capable of piercing the aseptic pack.

11. The apparatus of claim 1 wherein the heating chamber and the discharge duct are combined on a single, removable support.

12. The apparatus of claim 11 wherein the removable support includes a first pipe, a second pipe connected to the first pipe and forming a connection to a pressurized steam outlet duct associated with the water heater, and a third pipe mounted coaxially within the first pipe, wherein the heating chamber is formed between the first pipe and the third pipe, and wherein the third pipe forms the discharge duct.

13. The apparatus of claim 12 wherein the second pipe is connected perpendicular to the first pipe.

14. The apparatus of claim 12 wherein the first pipe is placed substantially vertically in the apparatus when in use.

15. The apparatus of claim 12 wherein the first pipe is joined with the third pipe by a plurality of rings.

16. The apparatus of claim 12 wherein the steam outlet duct includes a quick-coupling connector having a closable orifice for connection with the second pipe to prevent steam from escaping when the second pipe is disconnected from the steam outlet duct.

17. The apparatus of claim 1 which further includes a processor for controlling operations of the sequential dispenser and the water heater.

18. The apparatus of claim 17 wherein the processor is actuated by at least one control switch.

19. The apparatus of claim 1 wherein the discharge duct is a pipe passing through the heating chamber.

20. The apparatus of claim 19 wherein the heating chamber forms an annular space surrounding the pipe.

* * * * *